(12) United States Patent
Tiemann et al.

(10) Patent No.: US 11,112,184 B2
(45) Date of Patent: Sep. 7, 2021

(54) EVAPORATOR AND FUEL CELL ARRANGEMENT

(71) Applicant: DIEHL AEROSPACE GMBH, Ueberlingen (DE)

(72) Inventors: David Tiemann, Gau-Odernheim (DE); Jochen Schuerer, Gau-Bischofsheim (DE); Gunther Kolb, Neustadt/W. (DE)

(73) Assignee: DIEHL AEROSPACE GMBH, Ueberlingen (DE)

( * ) Notice: Subject to any disclaimer, the term of this patent is extended or adjusted under 35 U.S.C. 154(b) by 0 days.

(21) Appl. No.: 15/899,652

(22) Filed: Feb. 20, 2018

(65) Prior Publication Data

US 2018/0238629 A1   Aug. 23, 2018

(30) Foreign Application Priority Data

Feb. 20, 2017   (DE) .......................... 102017001567.8

(51) Int. Cl.
*F28D 9/00* (2006.01)
*F28F 3/04* (2006.01)
(Continued)

(52) U.S. Cl.
CPC ............ *F28D 9/0037* (2013.01); *F28F 3/048* (2013.01); *F28F 13/08* (2013.01); *H01M 8/0618* (2013.01);
(Continued)

(58) Field of Classification Search
CPC .. F28D 9/00; F28D 9/0037; F28D 2021/0064; F28F 3/04; F28F 3/3048; F28F 13/08; F22G 1/00; H01M 8/0612; H01M 8/04201; H01M 8/0618; H01M 8/0631; C01B 3/34; C01B 2203/0205;
(Continued)

(56) References Cited

U.S. PATENT DOCUMENTS

| 4,470,455 A | 9/1984 | Sacca |
| 6,508,301 B2 * | 1/2003 | Marsala ................ F25B 39/022 165/104.33 |

(Continued)

FOREIGN PATENT DOCUMENTS

| DE | 19963594 A1 | 7/2001 |
| DE | 10160834 A1 | 6/2003 |

(Continued)

*Primary Examiner* — Len Tran
*Assistant Examiner* — Gustavo A Hincapie Serna
(74) *Attorney, Agent, or Firm* — Scully, Scott, Murphy & Presser, P.C.

(57) ABSTRACT

The invention relates to an evaporator (V) comprising an evaporator body (3) surrounded by an evaporator housing (5) having an inlet (1) for supply of liquid into the evaporator housing (5) and an outlet (6) for discharge of vapour generated,
wherein the evaporator body (3) comprises a multitude of plates (7) arranged flat one on top of another,
wherein there is a liquid distributor (2) for distributing the liquid between the multitude of plates (7) arranged between the inlet (1) and the evaporator body (3),
wherein each of the plates (7) comprises, on a first surface, a liquid distributor structure (10) with distributor conduits (20, 21, 22), an evaporator area (11) and a gas collection structure (12).
The invention further relates to a corresponding fuel cell arrangement.

14 Claims, 5 Drawing Sheets

Figure 1:
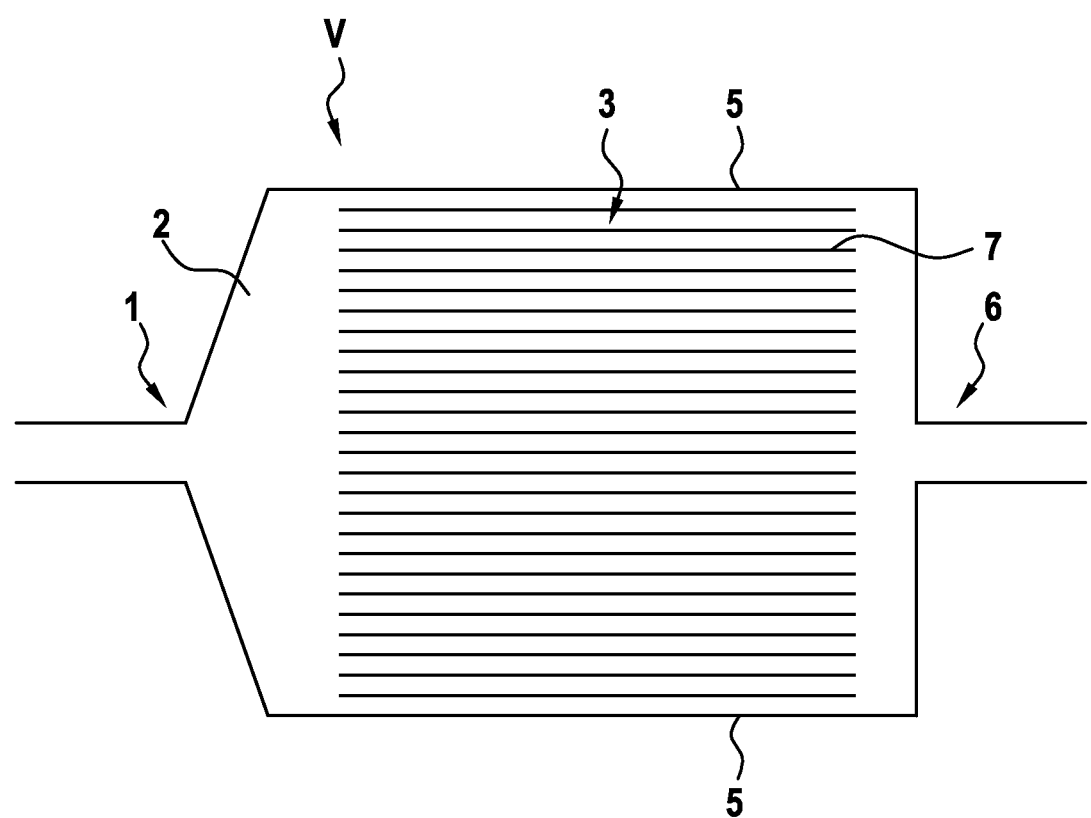

(51) Int. Cl.
*F28F 13/08* (2006.01)
*H01M 8/0612* (2016.01)
*F22B 1/02* (2006.01)
*F22B 3/02* (2006.01)
*F28D 21/00* (2006.01)
*F22G 1/00* (2006.01)

(52) U.S. Cl.
CPC ............ *B01J 2219/0086* (2013.01); *B01J 2219/00786* (2013.01); *C01B 2203/067* (2013.01); *C01B 2203/1294* (2013.01); *F22B 1/02* (2013.01); *F22B 3/02* (2013.01); *F22G 1/00* (2013.01); *F28D 2021/0043* (2013.01); *F28D 2021/0064* (2013.01); *H01M 8/0631* (2013.01)

(58) Field of Classification Search
CPC ........ C01B 2203/066; C01B 2203/067; C01B 2203/1294; B01J 2219/00786; B01J 2219/0086; B01J 2219/00783; B01J 2219/00801; B01J 2219/00804; F22B 1/02; F22B 3/02; B01D 1/00; B01D 1/22; B01D 1/30
USPC .................................................. 165/166, 167
See application file for complete search history.

(56) References Cited

U.S. PATENT DOCUMENTS

| | | | | |
|---|---|---|---|---|
| 6,793,027 B1* | 9/2004 | Yamada | ................... | B60K 1/04 180/65.1 |
| 7,032,654 B2* | 4/2006 | Wand | ...................... | F28D 9/005 165/133 |
| 8,167,030 B2* | 5/2012 | Kolb | ....................... | B01B 1/005 165/170 |
| 8,603,203 B2* | 12/2013 | Shin | ....................... | C01B 3/384 48/61 |
| 9,134,079 B2* | 9/2015 | Tonkovich | ........... | B01J 19/0093 |
| 9,266,732 B2* | 2/2016 | Park | .................... | H01M 8/0631 |
| 9,475,026 B2* | 10/2016 | Fitzgerald | ............ | B01J 19/0093 |
| 2002/0106311 A1* | 8/2002 | Golbig | ................ | B01F 13/1022 422/130 |
| 2003/0091885 A1* | 5/2003 | Kobayashi | ........... | H01M 8/242 29/623.2 |
| 2003/0152488 A1* | 8/2003 | Tonkovich | ........... | B01F 5/0614 422/400 |
| 2007/0053808 A1* | 3/2007 | Markowz | ............. | B01F 5/0471 422/222 |
| 2007/0072026 A1* | 3/2007 | Andrin | ................ | H01M 8/0267 429/435 |
| 2008/0166277 A1* | 7/2008 | Son | ........................ | B01J 19/249 422/198 |
| 2009/0104488 A1* | 4/2009 | Gruss | ...................... | F28F 3/048 429/411 |
| 2012/0125029 A1* | 5/2012 | Moreau | ..................... | F24D 3/18 62/235.1 |
| 2014/0044614 A1* | 2/2014 | Ha | ......................... | B01J 19/249 422/633 |
| 2014/0166137 A1* | 6/2014 | Noishiki | ................ | F16L 41/02 137/602 |
| 2016/0054072 A1* | 2/2016 | Mazet | ..................... | F28F 9/001 165/166 |
| 2016/0116233 A1* | 4/2016 | Shao | ...................... | F28D 9/0062 165/134.1 |
| 2016/0123677 A1* | 5/2016 | Persson | .................. | F28D 9/005 |
| 2016/0131432 A1* | 5/2016 | Neumann | ............. | F28D 9/0093 165/166 |
| 2016/0282064 A1* | 9/2016 | Yoon | ...................... | F28F 13/06 |
| 2017/0234622 A1* | 8/2017 | Mizushita | ............ | F28D 9/0037 165/166 |

FOREIGN PATENT DOCUMENTS

WO  WO 2006/108796 A1  10/2006
WO  WO 2006/110458 A1  10/2006

* cited by examiner

EVAPORATOR AND FUEL CELL ARRANGEMENT

The invention relates to an evaporator and to a fuel cell arrangement comprising an evaporator according to the invention.

An evaporator is known, for example, from WO 2006/108796 A1. The known evaporator has at least one evaporator plate having evaporator channels arranged in a trapezoidal region. The evaporator channels are what are called micro-evaporator channels having a cross section below 100 µm². However, the conventional evaporator is unsuitable for large evaporation outputs, since this results in non-constant vapour production. More particularly, a small mass flow rate of liquid results in formation of "vapour bubbles" and prevention of effective evaporation.

The U.S. Pat. No. 4,470,455 discloses a liquid pipe conduit for a heat exchanger, formed by a pair of plates of which the edge regions are bonded in order to create a coolant shell between plate middle sections for a flow to pass through. The liquid inlet and outlet collection conduits in each pair are formed by drawn arrangements offset in the outward direction. Between the collection conduits, rows of separated ribs are formed in a similar manner, with each rib in an oblique position between the distributors relative to the flow pathway and each row extending transverse to the normal of the flow pathway. The ribs in each row are staggered and overlap other ribs in the direction of flow, in order to prevent linear flow across all the transverse rows between the inlet collection conduit and the outlet collection conduit, but to provide an interrupted linear flow pathway or a bypass across the middle of the transverse rows, in addition to bypass flow pathways past the ends of the rows, in order to improve the heat transfer efficiency without significantly increasing the pressure drop.

DE 101 60 834 A1 discloses, inter alia, an apparatus for evaporating and superheating at least one medium, having at least two reaction stages, wherein at least one first reaction stage takes the form of an evaporator (20) for at least partial evaporation of the at least one medium. The evaporator (20) has at least one flow unit for passing the medium to be evaporated through and a heating unit for providing thermal energy for at least partial evaporation of the medium flowing through the flow unit, with thermal coupling of the flow unit to the heating unit. In addition, at least one second reaction stage downstream of the evaporator (20) is designed in the form of a superheater (50) for superheating the evaporated medium. The superheater (50) has a flow unit for passing the medium exiting from the evaporator (20) through, and a superheating unit for provision of thermal energy for heating of the medium flowing through the flow unit, wherein the flow unit is thermally coupled to the superheating unit. In order to create a high-performance and nevertheless compact apparatus, the at least one evaporator (20) and the at least one superheater (50) take the form of a layer composite composed of individual layers.

The problem addressed by the invention is that of eliminating the disadvantages according to the prior art. More particularly, an evaporator is to be specified for a power range in the kilowatt range. A further problem addressed by the invention is that of specifying a fuel cell arrangement comprising an evaporator of this kind.

The problem addressed by the invention is solved by the features of independent claims 1 and 13. Appropriate configurations of the invention will be apparent from the dependent claims 2 to 12 and 14.

According to the present invention, an evaporator is proposed, comprising an evaporator body surrounded by an evaporator housing having an inlet for supply of liquid into the evaporator housing and an outlet for discharge of vapour generated.

The evaporator body comprises a multitude of plates arranged flat one on top of another. There is a liquid distributor for distributing the liquid between the multitude of plates arranged between the inlet and the evaporator body. Each of the plates comprises, on a first surface, a liquid distributor structure with distributor conduits, an evaporator area and a gas collection structure. The liquid distributor structure, evaporator area and gas collection structure are each bounded by the respective adjacent plate such that cavities formed thereby have fluid connection to one another exclusively via the liquid distributor and downstream of the gas collection structure.

The evaporator according to the invention has the advantage that the formation of vapour bubbles can be avoided. The evaporator can be used for generation of saturated vapour or superheated vapour. The liquid to be evaporated is distributed very homogeneously between the individual plates and the vapour can flow away unhindered. The evaporator area may be configured in an essentially rectangular manner. By virtue of the liquid distributor structure, it is possible for a liquid to be evaporated to flow essentially homogeneously onto the evaporator area. On an opposite side of the evaporator area from the liquid distributor is arranged the gas collection structure which is connected to the outlet of the evaporator housing. The vapour generated is guided from the evaporator area through the gas collection structure to the outlet of the evaporator housing.

The distribution of the liquid between a multitude of plates likewise allows homogeneous evaporation to be achieved by means of the liquid distributor.

Appropriately, the liquid distributor structure is in one-piece form together with the plate. In an appropriate configuration, the liquid distributor structure comprises a distributor feed which branches into at least two first distributor conduits. The division into at least two first distributor conduits achieves better distribution of the liquid over the evaporator area. The liquid distributor structure may especially comprise further distributor conduits, such that there is a structure that branches in the manner of a tree.

Appropriately, the liquid distributor structure opens into the evaporator area.

The evaporator area of the evaporator according to the invention appropriately takes the form of a depression and/or elevation in the plate. An evaporator plate in the form of a depression has a frame surrounding the evaporator area. The evaporator area may especially be an essentially rectangular cutout. Preferably, the evaporator area has a structured region having an elevated and/or depressed pattern. The pattern meets the plate arranged directly above in the raised regions, such that the raised regions form a seal to the plate above. The structured region may also include just part of the evaporator area. In an appropriate configuration, the evaporator area comprises three successive regions, which are mutually adjoining regions arranged in succession in a first direction running from the liquid distributor structure to the gas collection structure. The region adjoining the liquid distributor structure preferably does not have a surface structured with a pattern. This is followed by the structured region having a pattern. The pattern may, for example, be a herringbone pattern, a wavy pattern or a zigzag pattern. There may again be a region formed without a pattern extending toward the gas collection structure. The region with a pattern extends in a second direction arranged at right angles to the first direction, preferably over the full area.

In one configuration of the evaporator of the invention, the pattern is a herringbone pattern. A herringbone pattern of this kind has the advantage that the structuring of the evaporator surface is completely open and hence it is not possible for any gas bubbles that prevent mass flow of liquid to become established.

In a further configuration, the evaporator area comprises grooves or channels which have deflection sites and run in a direction away from the liquid distributor structure. The channels preferably run in the form of a wave. In this way, it is possible to achieve an elevated efficiency of the evaporator.

In a further configuration, the gas collection structure comprises at least two gas collection conduits which are combined and/or a curved outlet channel. The gas collection structure of the evaporator according to the invention promotes unhindered flow of the vapour formed away.

Appropriately, at least some of the plates have heating channels on a face opposite the first surface or the plates are flat.

It is possible for a heating medium to be conducted along the plate through heating channels on the reverse side of the plate for evaporation of the liquid. In that case, the heating channels have fluid connection via a further inlet provided in the evaporator housing and a further outlet.

Appropriately, two adjacent plates are stacked flush one on top of the other. More particularly, the edges of the liquid distributor structure, of the evaporator area and of the gas collection structure may form a seal with the adjacent plates, such that cavities present between every two plates are separated from one another.

Additionally proposed is a fuel cell arrangement comprising at least one evaporator according to the invention, a reformer, a PrOx reactor and a fuel cell. The fuel cell arrangement especially comprises a series connection of the evaporator, a reformer, a water-gas shift reactor, a PrOx reactor and a fuel cell. The reformer, water-gas shift reactor and PrOx reactor are reactors in which the fuel evaporated in the evaporator is converted in three successive reactions, optionally with addition of air, to a further fuel having a low carbon monoxide content which is rendered utilizable to the fuel cell. Appropriately, the fuel cell arrangement is designed for operation with propylene glycol. This means that a propylene glycol/water mixture is evaporated in the evaporator.

Figure 2:
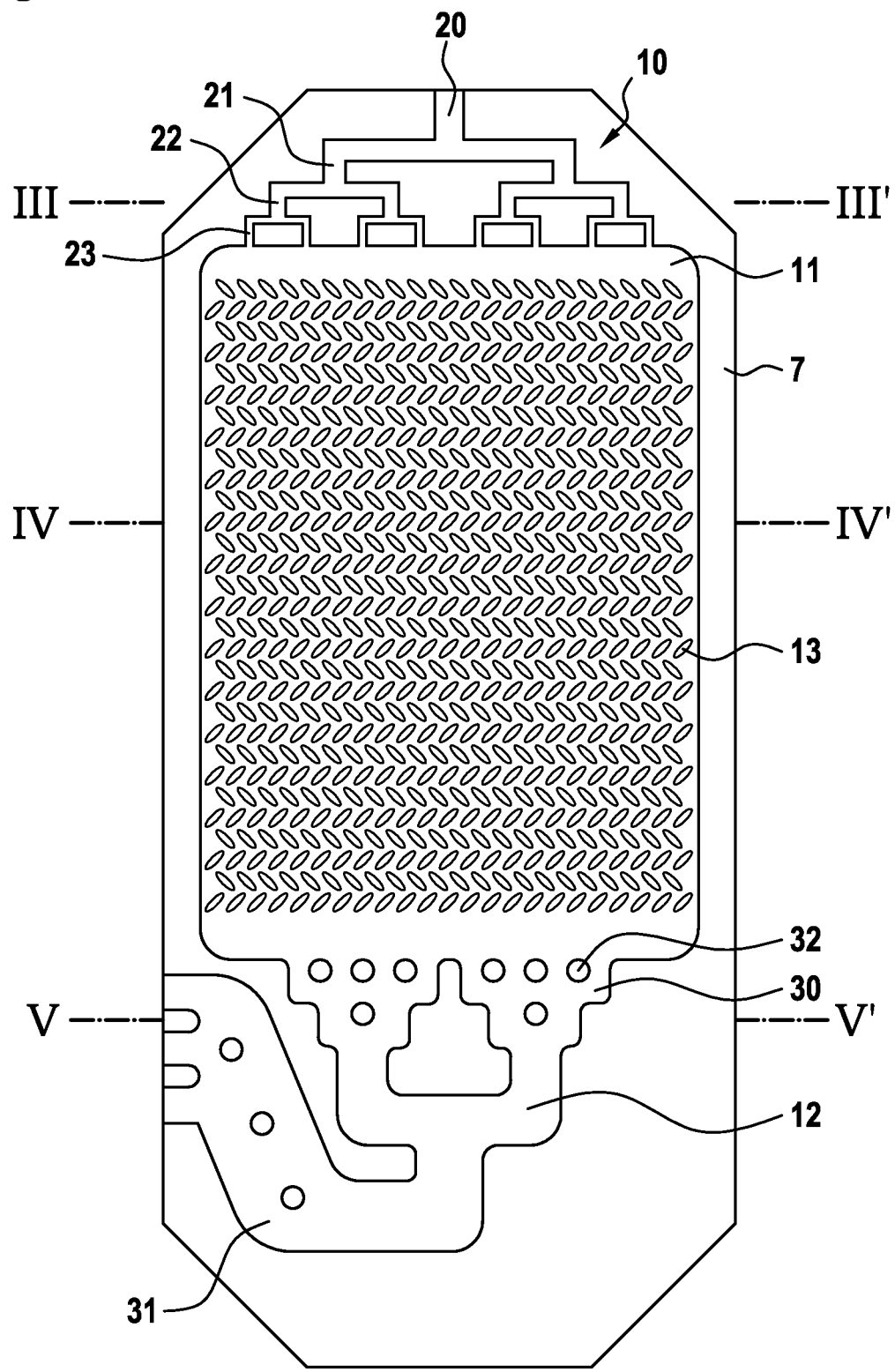
Figure 3:
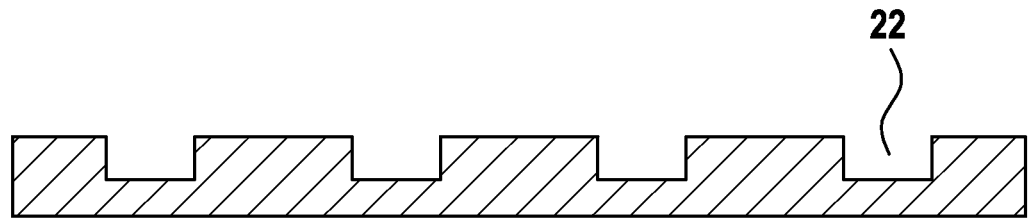
Figure 4:
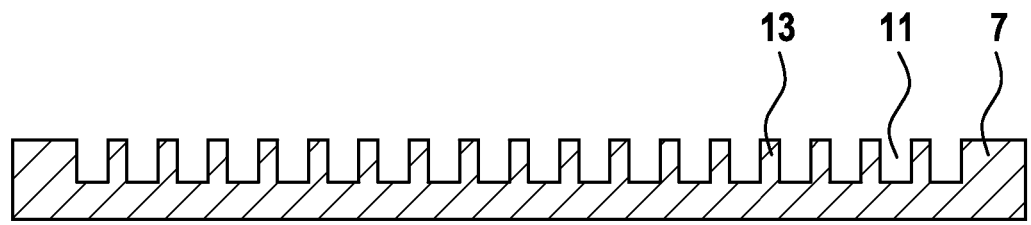
Figure 5:
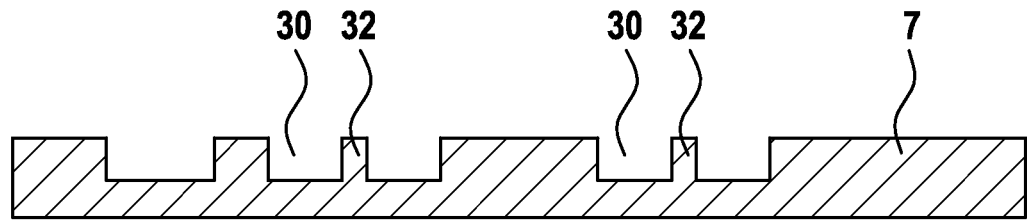
Figure 6:
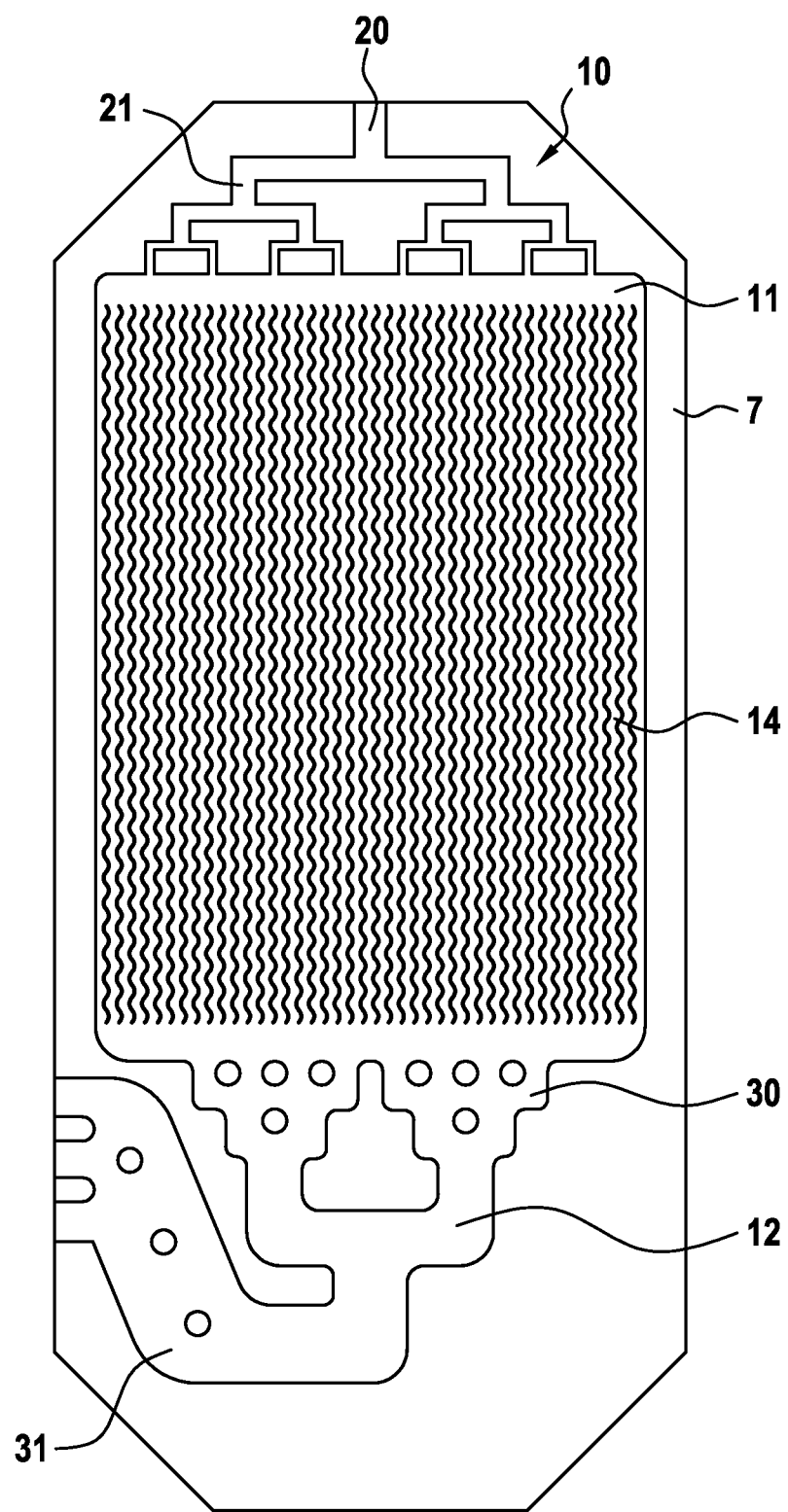
Figure 7:
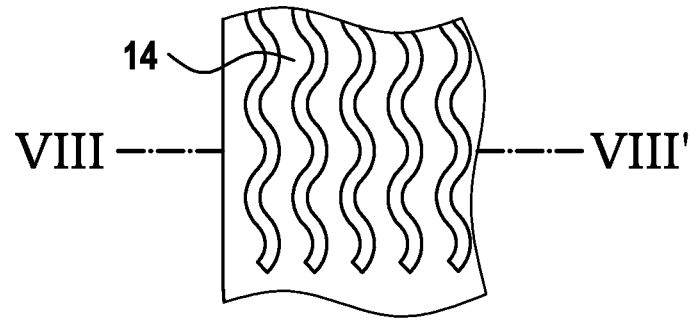
Figure 8:
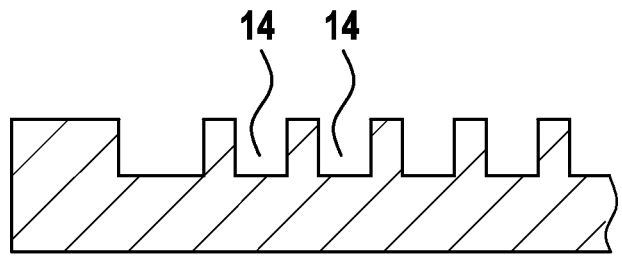
Figure 9:
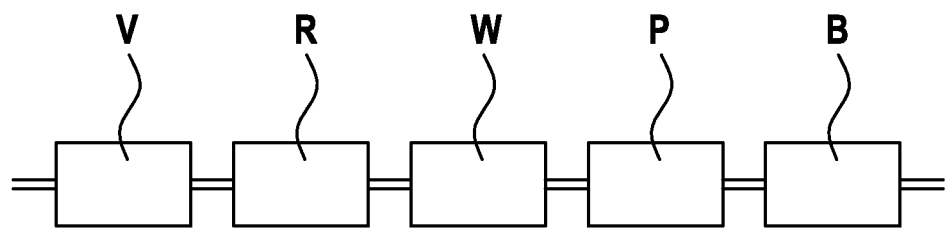

The invention is elucidated hereinafter with reference to drawings. The drawings show:

FIG. 1 a schematic drawing of an evaporator of the invention in cross section, FIG. 2 a first configuration of an evaporator plate of an evaporator of the invention, FIG. 3 a cross section through the evaporator plate according to FIG. 2 along the line III-III', FIG. 4 a cross section through the evaporator plate according to FIG. 2 along the line IV-IV', FIG. 5 a cross section through the evaporator plate according to FIG. 2 along the line V-V, FIG. 6 a second configuration of an evaporator plate, FIG. 7 a detail enlargement of the evaporator plate according to FIG. 6, FIG. 8 a cross section through the evaporator plate according to FIG. 7, and FIG. 9 a fuel cell arrangement according to the invention.

FIG. 1 shows an evaporator V having an inlet 1, an evaporator housing 5 and an outlet 6. A liquid distributor 2 is connected between the inlet 1 and an evaporator body 3, with which a liquid is distributed between plates 7. The liquid distributor 2 in this working example takes the form of a cavity 8. However, the liquid distributor 2, in an alternative configuration, may also comprise a treelike liquid distributor structure. The plates 7 are arranged flat one on top of another, such that the stack of the plates 7 is apparent in FIG. 1.

FIG. 2 shows a configuration of a plate 7. The plate 7 comprises a liquid distributor structure 10. The liquid distributor structure 10 has a distributor feed 20 which divides into first distributor conduits 21, especially two first distributor conduits 21. The first distributor conduit 21 may further divide into second distributor conduits 22 and subsequently into third distributor conduits 23. The first 21, second 22 and third distributor conduits 23 form a treelike structure, such that the cross section, for example, of a first distributor conduit 21 is equal to the sum total of the second distributor conduits 22 that branch off therefrom. Such a liquid distributor structure 10 results in application of the liquid to an evaporator area 11 at a uniform pressure and a uniform rate.

The evaporator area 11 is an essentially rectangular area. In a middle region, a pattern 13 is formed on the evaporator area 11 in a direction from the liquid distributor structure 10 to the gas collection structure 12. The evaporator area 11 takes the form of a depression in the plate 7. The pattern 13 is a raised structure, for example a herringbone pattern. The herringbone pattern prevents the liquid from flowing to the gas collection structure 12 without deflection by the liquid distributor structure 10. The pattern 13 forms an open structure, such that blockage of individual channels on the evaporator area 11 is efficiently prevented.

The gas collection structure 12 includes two gas collection conduits 30. There are further structural elements present in the gas collection conduits 30 that take the form of stubs 32. The gas collection conduits 30 collect the gas and open into an outlet channel 31. The outlet channel 31 appropriately has a deflection, such that the gas generated, the vapour, is discharged on one side of the plate 7.

FIG. 3 shows a cross section of the plate 7 according to FIG. 2 along the section line III-III'. The cross-sectional view cuts through four second distributor conduits 22. The second distributor conduits 22 each have the same depth and each have the same width.

FIG. 4 shows a cross section of the plate 7 according to FIG. 2 along the section line IV-IV'. This clearly shows the recessed evaporator area 11 with the pattern 13 protruding above it. The grooves generated by the pattern 13 all have the same depth. The elevations of the pattern 13 are thus at the same level as the unstructured edge of the plate 7. It is thus possible for two plates 7 lying one on top of another to be sealed, especially towards the edge, and simultaneously to be supported on one another by virtue of the elevations in the pattern 13.

FIG. 5 shows a cross section through the gas collection structure 12. The stub 32 arranged in the gas collection conduit 30 and an edge of the plate 7 have the same height.

FIG. 6 shows a further configuration of a plate 7. In a departure from the first execution according to FIG. 2, the plate 7 has a pattern 13 in the form of wavy channels 14. One dimension of the channels 14 is in the region of width about 1 mm with a smaller depth. The wavy channels 14 extend solely within a middle region of the evaporator area 11.

A section of such channels 14 is shown in top view in FIG. 7 and in cross section in FIG. 8. The channels 14 have the same depth.

FIG. 9 shows a fuel cell arrangement. The fuel cell arrangement is a series connection of an evaporator V, followed by a reformer R, a water-gas shift reactor W, a PrOx reactor P and a fuel cell B. The evaporator V is an evaporator according to the preceding working examples. By virtue of the series connection of the reactors, the fuel evaporated in the evaporator V, especially a propylene glycol/water mixture, is processed such that it can be used for generation of power in the fuel cell B. The fuel cell B in this working example has a power of 5 kW.

LIST OF REFERENCE NUMERALS

1 inlet
2 liquid distributor
3 evaporator body
5 evaporator housing
6 outlet
7 plate
8 cavity
10 liquid distributor structure
11 evaporator area
12 gas collection structure
13 pattern
14 channel
20 distributor feed
21 first distributor conduit
22 second distributor conduit
23 third distributor conduit
30 gas collection conduit
31 outlet channel
32 stub
B fuel cell
P PrOx reactor
R reformer
V evaporator
W water-gas shift reactor

The invention claimed is:

1. An evaporator comprising an evaporator body surrounded by an evaporator housing having an inlet for supply of liquid into the evaporator housing and an outlet for discharge of vapour generated, wherein the evaporator body is structurally separate from the evaporator housing,
  wherein the evaporator body comprises a multitude of solid closed plates arranged flat, one solid closed plate on top of another solid closed plate,
  wherein there is a liquid distributor for distributing the liquid between the multitude of solid closed plates, wherein the liquid distributor is arranged between the inlet and the evaporator body,
  wherein each of the solid closed plates comprises, on a first surface, a liquid distributor structure with distributor conduits, an evaporator area and a gas collection structure,
  wherein the liquid distributor structure comprises a distributor feed which branches into at least two first distributor conduits; and
  wherein at least some of the solid closed plates have heating channels on a face opposite the first surface of the solid closed plate, said heating channels having fluid connection via a further inlet and a further outlet provided in the evaporator housing.

2. The evaporator according to claim 1, wherein the liquid distributor structure is in one-piece form together with the solid closed plate of the multitude of plates.

3. The evaporator according to claim 1, wherein the liquid distributor structure opens into the evaporator area.

4. The evaporator according to claim 1, wherein the evaporator area takes the form of a depression or elevation in the solid closed plate.

5. The evaporator according to claim 1, wherein the evaporator area comprises a structured region with a raised and/or depressed pattern.

6. The evaporator according to claim 5, wherein the pattern is a herringbone pattern.

7. The evaporator according to claim 1, wherein the evaporator area comprises grooves which have deflection sites or channels which have deflection sites and run in a direction pointing away from the liquid distributor structure.

8. The evaporator according to claim 7, wherein the channels run in the form of a wave.

9. The evaporator according to claim 1, wherein the gas collection structure comprises at least two gas collection conduits which are combined, and/or a curved outlet channel.

10. The evaporator according to claim 1, wherein at least some of the solid closed plates are flat on a second face opposite the first surface.

11. The evaporator according to claim 1, wherein two adjacent solid closed plates are stacked flush one on top of another.

12. The evaporator according to claim 11, wherein edges of the liquid distributor structure, the evaporator area and the gas collection structure form a seal with a solid closed plate arranged adjacent thereto.

13. A fuel cell arrangement comprising at least one evaporator according to claim 1, a reformer (R), a PrOx reactor (P) and a fuel cell (B).

14. A method of producing power in a fuel cell comprising processing a propylene glycol/water mixture through the fuel cell arrangement of claim 13.

* * * * *